United States Patent
Farhadiroushan et al.

(10) Patent No.: US 8,005,323 B2
(45) Date of Patent: Aug. 23, 2011

(54) METHOD AND APPARATUS FOR GENERATION AND TRANSMISSION OF HIGH ENERGY OPTICAL PULSES FOR LONG RANGE MEASUREMENTS

(75) Inventors: Mahmoud Farhadiroushan, Middlesex (GB); Tom Richard Parker, London (GB); Peter Neil Kean, Royston (GB)

(73) Assignee: Sensornet Limited, London (GB)

( * ) Notice: Subject to any disclaimer, the term of this patent is extended or adjusted under 35 U.S.C. 154(b) by 1614 days.

(21) Appl. No.: 10/545,425

(22) PCT Filed: Feb. 11, 2004

(86) PCT No.: PCT/GB2004/000565
§ 371 (c)(1),
(2), (4) Date: Aug. 10, 2005

(87) PCT Pub. No.: WO2004/073172
PCT Pub. Date: Aug. 26, 2004

(65) Prior Publication Data
US 2006/0210269 A1  Sep. 21, 2006

(30) Foreign Application Priority Data

Feb. 12, 2003 (GB) .................................. 0303118.4
Feb. 12, 2003 (GB) .................................. 0303155.6

(51) Int. Cl.
*G02B 6/00* (2006.01)
*G01J 1/04* (2006.01)
*G01J 1/42* (2006.01)
*G01J 5/08* (2006.01)
*G01J 4/00* (2006.01)
*G01J 3/00* (2006.01)
*G01J 3/44* (2006.01)
*G01N 21/00* (2006.01)
*G02F 1/35* (2006.01)
*G02F 2/02* (2006.01)

(52) U.S. Cl. ................. 385/12; 250/227.14; 250/227.18; 356/73.1; 356/300; 356/301; 359/326; 359/327

(58) Field of Classification Search .................... 385/12
See application file for complete search history.

(56) References Cited

U.S. PATENT DOCUMENTS 4,767,219 A * 8/1988 Bibby ........................... 374/123
(Continued)

FOREIGN PATENT DOCUMENTS

DE    EP 0 502 422 B1 *  5/1996
(Continued)

*Primary Examiner* — Uyen-Chau N Le
*Assistant Examiner* — Kajli Prince
(74) *Attorney, Agent, or Firm* — Barkume & Associates, P.C.

(57) ABSTRACT

A method and apparatus for generating and transmitting high energy optical pulses are described. Distributed temperature sensors usually use Raman scattering in optical fibers as the means to determine the temperature. Here, light from a laser source is sent down a fiber and the small amount of light that is scattered back towards the source is analysed. As the fiber length increases, the resolutions of the temperature and loss measurements become poorer. This is because losses in an optical fiber attenuate the signal. An obvious solution to this problem is to launch more light into the fiber to compensate for the losses but stimulated Raman scattering limits how much light may be launched. The present invention solves this problem by using a pulse conversion method to maximize the resultant pulse energy while the power is kept below SRS threshold.

24 Claims, 5 Drawing Sheets

U.S. PATENT DOCUMENTS

| | | | |
|---|---|---|---|
| 5,194,847 A | 3/1993 | Taylor et al. | |
| 5,323,224 A * | 6/1994 | Wada | 356/73.1 |
| 5,592,282 A * | 1/1997 | Hartog | 356/44 |
| 5,923,683 A * | 7/1999 | Morioka et al. | 372/6 |
| 6,285,806 B1 * | 9/2001 | Kersey et al. | 385/12 |
| 6,384,945 B1 | 5/2002 | Hakimi et al. | |
| 6,498,801 B1 * | 12/2002 | Dudelzak et al. | 372/22 |
| 7,284,903 B2 | 10/2007 | Hartog | |

FOREIGN PATENT DOCUMENTS

| | | |
|---|---|---|
| EP | 0 300 529 B1 | 4/1993 |
| EP | 0 502 422 B1 | 5/1996 |
| EP | 1 274 192 A1 | 1/2003 |
| JP | 04-274724 | 9/1992 |
| JP | 06-123661 * | 10/1992 |
| JP | H05-046145 | 6/1993 |
| JP | 06-123661 | 5/1994 |
| JP | 09-061261 * | 8/1995 |
| JP | 08-219906 | 8/1996 |
| JP | 09-061261 | 3/1997 |
| JP | 2002-296630 | 10/2002 |
| WO | WO 87/07014 | 11/1987 |
| WO | WO 98/30881 | 7/1998 |

* cited by examiner

METHOD AND APPARATUS FOR GENERATION AND TRANSMISSION OF HIGH ENERGY OPTICAL PULSES FOR LONG RANGE MEASUREMENTS

FIELD OF THE INVENTION

The present invention relates to sensing systems, to a method and apparatus for generating and transmitting high energy light pulses for sensing, particularly for long range measurements and, in particular, for the distributed optical fibre measurement of measurands such as temperature and loss over long distances, and to transmitters for such systems, to receivers for such systems, and to apparatus for, and methods of, generating pulses for such purposes.

BACKGROUND

There is a requirement in industry for the measurement of temperature at all points over long distances. Typical uses are for monitoring long cables and pipelines. As these structures may be very long, there is a need for a sensing system that operates over very long distances. There is a requirement in communications and sensing to measure the loss along optical fibres. As these fibres may be very long, there is a need for a loss measurement system that operates over very long distances.

Distributed temperature sensors usually use Raman scattering in optical fibres as the means to determine the temperature. Here, light from a laser source is sent down a fibre and the small amount of light that is scattered back towards the source is analysed. By using pulsed light and measuring the returning signal as a function of time, the backscattered light that was generated at all points along the fibre can be determined. This backscattered light contains components that are up- and down-shifted in frequency from the source light (Raman and Brillouin anti-Stokes and Stokes light respectively) and light that is elastically scattered (Rayleigh light). The powers of the returning Raman and Brillouin signals are temperature dependent and so analysis of these components yields the temperature. Usually, the Raman Stokes and anti-Stokes signals are used to determine the temperature however sometimes the Rayleigh light is used as a reference and sometimes the Brillouin components are used. The Rayleigh light, and sometimes the Raman Stokes light, is often used to measure the loss along an optical fibre.

An example is known from U.S. Pat. No. 5,194,847 relating to fibre optic intrusion sensing. In this case, for sensing intrusion into a predefined perimeter, a coherent pulsed light is injected into an optical sensing fibre positioned along the predefined perimeter. A backscattered light in response to receiving the coherent light pulses is produced and coupled into an optical receiving fibre. The backscattered light is detected by a photodetector and an intrusion is detectable by a change in the backscattered light. To increase the sensitivity of the apparatus, a reference fibre and an interferometer may also be employed.

As the fibre length increases, the resolutions of the temperature and loss measurements become poorer. This is because there are causes of loss in an optical fibre that attenuate the signal. As the length of the fibre is increased, the overall loss over the length of the fibre increases and so the signal returning from the far end is smaller and, as a consequence, noisier. An obvious solution to this problem is to launch more light into the fibre to compensate for the losses but there is a limit to how much light may be launched. This is because when high power light is sent down a fibre, there are non-linear effects that become significant as the length of the fibre is increased. The most problematic of these is the stimulated Raman effect. This takes power from the source light and shifts it to the wavelength of the Raman Stokes signal. It is usually this stimulated Raman scattering (SRS) that limits the length over which a distributed sensor of this type may operate. It is known from "Optical Time Domain Reflectometry", Hartog, Arthur, Harold, and WO 1998 GB 0000028, Jan. 8, 1997, to attempt to alleviate this problem by proposing fibres that make the SRS threshold occur at higher input powers so that more power may be usefully used in the fibre. This approach is restrictive, however, as it requires the technique be used in potentially expensive, specialised fibres. This approach will also not allow the system to be used on normal optical fibres that may have previously been installed.

Another cause of poorer resolution of the temperature and loss measurements as the fibre length increases is the longer round trip delay for each pulse. It is normally only possible to usefully have one pulse in the fibre at any time as otherwise it would not be possible to determine where the returning signal was generated (the backscattered signals from the multiple pulses would overlap). The time for a light pulse to travel along a fibre is proportional to the length of the fibre and so, as the length of the fibre is increased, the time between the pulses that can be launched has to be increased. As typically many averages are required to measure the signal with a reasonable accuracy, this necessary reduction in pulse repetition rate means that the measurements become less accurate as the sensing length is increased. However, the SRS threshold cannot be raised indefinitely and the pulse repetition rate is still limited by the round-trip time of the pulse through the whole length of fibre.

Another source of error is differential loss at different wavelengths. This is a property of most common types of fibre and is a source of error because the temperature calculation involves determining a ratio of powers of the returning light at different wavelengths. The Raman Stokes and anti Stokes components are shifted to different wavelengths and so suffer different amounts of loss. As the distance of the desired measurement point along the fibre increases, this source of error becomes more significant. It is sometimes possible to reduce the error by choosing a launch wavelength which minimises the differential loss for the given fibre. It is also possible to use two optical sources or a single tunable source to transmit at two different wavelengths, take measurements using the stokes wavelength from one and the anti stokes wavelength for the other, to cancel out the differential loss. This is shown in U.S. Pat. No. 4,767,219. This can cancel the differential loss error, but it would be difficult or expensive to ensure the two sources are sufficiently similar over their lifetime that other errors are not introduced. The single tunable source is less practical because it is difficult to tune and pulse such sources.

SUMMARY OF THE INVENTION

It is an object of the present invention to provide improved apparatus and methods. According to a first aspect of the invention, there is provided:

A sensing system for sending electromagnetic signals along a waveguide for sensing conditions at one or more sensing locations along the waveguide,
  the system comprising a transmitting means arranged to transmit pulses of suitable shape to cause a controlled conversion of the pulses to a different wavelength by a stimulated inelastic scattering process before reaching the sensing location, the system comprising a receiving means arranged to receive signals returned from the sensing location, and to determine the conditions based on the received signals.

This cleverly exploits the non-linear effects which up to now have been avoided or minimised. After a short transition length all the original light is converted to this new wavelength which is then used to illuminate the remaining length of fibre. One advantage is that it can enable the distance limit to be raised for a given level of sensing accuracy or resolution, since the launch power can be much greater and so returned optical signals returned from greater distances along the fibre can be detected. Another advantage is that it can provide a self-optimisation process because as the distance is increased, the light shifts towards longer wavelengths, which incur lower fibre scatter losses. The electromagnetic signals can be optical signals or other wavelengths. The shape refers to the shape on a power vs time graph for example. The peak power is one part of the shape which has a strong influence on controlling where the SRS wavelength conversion takes place but the pulse width and characteristics of the transmission medium also play a part.

As an additional feature, the launch power can be arranged such that different parts of the fibre are illuminated at more than one different wavelengths, and the receiving means can be arranged to distinguish the returning optical signals at each of the different wavelengths. An advantage of this is that it can enable more than one pulse to be travelling along the fibre at one time. The pulses can be timed so that when a first pulse has been converted to the different wavelength, a succeeding pulse can be sent. The backscatter from the succeeding pulse can now be distinguished at the receiver from the desired backscatter from the first pulse at the different wavelength, by appropriate filtering. This can enable an increase in the repetition rate of the pulses to further improve the sensing accuracy by enabling more averaging or allowing more rapid sensing for a given accuracy and spatial resolution.

As another additional feature, the transmitting means is arranged to adjust the launch power to move a transition length where the converting takes place, to a different part of the fibre. This is useful to avoid gaps in sensing coverage caused by the transition lengths.

As another additional feature, the receiving means is additionally arranged to receive signals returned from one or more further sensing locations, before the conversion.

This enables shorter distance sensing to be carried out with a higher power pulses before conversion, as well as longer distance sensing using the wavelength converted pulses.

As another additional feature, the sensing system is arranged to compensate for differential fibre loss. As another additional feature, the transmitting means comprises a source for generating pulses, a splitter arranged to split the pulses into two or more streams, and a convertor for converting the wavelength of one of the streams, before sending both streams along the fibre, to enable compensation of the differential fibre loss.

As another additional feature, the receiving means is arranged to compensate for differential loss by detecting an up shifted component returned from one of the pulses at a first wavelength, and a down shifted component returned from one of the pulses transmitted at a second wavelength, down shifted to the first wavelength. This means the two components have experienced the same loss regardless of the amount of differential loss, and so a ratio of these two components will cancel out any differential loss.

As another additional feature, the system has a controller for controlling a pulse repetition rate. This can be useful to maximise the rate, up to the limit of one pulse per section between each transition region at any time for example. This helps exploit the possibility of higher rates if the power is changed to cause more wavelength conversions along the fibre.

A second aspect of the invention provides a transmitter means for use as part of a sensing system for sending and receiving optical signals along a fibre for sensing conditions along the fibre, the transmitter means having a source for generating a stream of pulses, a splitter arranged to split the pulses into two or more streams, and a convertor for converting the wavelength of one of the streams, before sending both streams along the fibre.

An advantage of creating the two streams from a single source is that there is no need to control accurately the wavelength separation of the two lasers, to enable accurate correction of differential fibre loss.

Each stream of pulses may have sufficient power to convert the wavelength of the signal by SRS and illuminated the sensing fibre at least two different wavelengths that are separated by the Stokes wavelength shifts of the other wavelength to enable to measure and correct for differential fibre loss.

As an additional feature, the source and splitter are arranged to provide sufficient power in the pulses reaching the convertor such that the conversion is carried out by stimulated inelastic scattering.

As an additional feature, the transmitter means further comprises a pulse shaper for lengthening the pulses before sending along the fibre.

As an additional feature, the pulse shaper comprises a dispersive element. This is one way of achieving spreading of the pulses to control the peak power and pulse width while maintaining the pulse energy. Longer pulse widths reduce spatial resolution but higher pulse energy can improve accuracy of detection and sensing, or improve distance for a given accuracy for example. The dispersive element is optionally incorporated within the converter to keep the number of elements to a minimum.

As an additional feature, the pulse shaper comprises a pulse train generator for converting each pulse into a train of pulses, and a dispersive element for shaping the train of pulses. An advantage of this is that the pulse can be spread more widely in time for a given amount of dispersion. This can produce a more evenly spread pulse and reduce the costs, delays and losses caused if large amounts of dispersion are needed. A widely spread pulse is useful to give more energy and so greater distance for a given power level.

According to a third aspect of the present invention there is provided an apparatus for initiating one or more generations of stimulated Raman light such that different parts of the fibre are illuminated by different wavelengths so that high input powers may be used and such that more than one pulse may be in the fibre; and for measuring the power of different components of backscattered light to enable the distributed measurement of temperature and/or loss over a long distance, which apparatus comprises at least one optical fibre which provides a scattering medium, an optical source, optical filtering means and a means for converting the optical signal into an electrical signal which may comprise a single detector or an array of detectors.

This aspect provides a sensing system for sending and receiving optical signals along a fibre for sensing conditions along the fibre, the system having a transmitter means arranged to initiate one or more generations of stimulated Raman light such that different parts of the fibre can be illuminated by different wavelengths, and arranged to transmit more than one pulse in the fibre at the same time; and receiving means for measuring the power of different components of backscattered light for sensing over a long distance of the fibre, the receiving means having optical filtering means and one or more detectors for converting the optical signal into an electrical signal.

As an additional feature for a dependent claim, the receiving means is arranged to distinguish Raman Stokes or Raman anti-Stokes or Rayleigh wavelengths backscattered from a forward travelling pulse. These components can be used to correct for fibre loss and compute the temperature along the sensing fibre.

As a further additional feature, the receiving means has filters arranged such that a desired backscattered signal is collected at a slightly offset wavelength compared to a wavelength of the transmitted pulses before wavelength conversion. This helps avoid crosstalk between anti-Stokes wavelengths returned from the pulse after conversion and Rayleigh scattering returned at the same wavelength from any residual of the initial pulse before conversion that is still propagating.

As a further additional feature, it is arranged to repeat measurements with different pulse powers, and use the results to correct for non-linearities.

As a further additional feature, the system comprises the fibre.

As a further additional feature, the system is arranged to control the power of the pulses to change a position of a transition length along the fibre, where wavelength conversion takes place.

As a further additional feature, the transmitting means comprising a laser, a modulator for producing pulses from the laser output, and an optical amplifier for amplifying the pulses. This can help enable the pulse shape to be controlled more easily.

As a further additional feature, the receiving means has filters arranged such that Raman Stokes and/or Raman anti-Stokes and/or Rayleigh signal components backscattered from one section of the fibre are collected without significant overlap from equivalent components backscattered from other sections.

As a further additional feature, the receiving means is arranged such that one of, two of or all of the returning Raman Stokes, Raman anti-Stokes and Rayleigh signals are compared to correct for any non-linearity in the signals.

As another additional feature, the receiving means being arranged to use a combination of the returning Raman Stokes and Raman anti-Stokes components which are in a saturated, non linear region of their relationship to the sensed condition, to compensate for the non linearities.

A fourth aspect of the present invention uses a pulse conversion method to optimise the resultant pulse energy while the power is kept below SRS threshold. It is also useful for systems which exploit SRS wavelength conversion as discussed above. According to this aspect of the invention, there is provided a pulse shaper for shaping an optical input pulse, the shaper having a pulse train generator for generating a train of pulses from the input optical pulse, the generator comprising a means for splitting the input optical pulse between two or more paths with different delays, to create delayed pulses, and a combiner for combining the delayed pulses to create the train, and a dispersive element located before or after the generator to spread the input pulse or the train respectively.

This can enable an optical pulse to have its shape (in terms of its profile of power at different time or distance for example) modified for various purposes. This is often more practical than trying to control an optical source to produce the desired shape. This is particularly so where the pulse needs to be of high power and of tightly controlled wavelength. An advantage of generating a train is that the input pulse can be spread more widely in time or space for a given amount of dispersion. This can produce a more evenly spread pulse and reduce the costs, delays and losses caused if large amounts of dispersion are needed. A widely spread pulse is useful to give more energy and so greater sensing distance for a given power level.

As an additional feature, the shaper has one or more optical switches for selecting which of the delayed pulses form the train. This is one way to control the form of the train to control the shape of the output, such as the length of the train.

The SRS limit is dependent upon the pulse power, rather than energy, whereas the returning signal is dependent upon the pulse energy, rather than power. In order to extend the sensing length without needing to use an SRS wavelength conversion, one would need to maximise the pulse energy while the pulse power is kept below SRS threshold. This can be achieved by using long, low power pulses. The factor that governs the maximum useful length of the pulse is the spatial resolution of the system. The pulse width must not exceed twice the length of the spatial resolution required. Thus, in order to maximise the returning signal for a given SRS limit, the pulse width should equal twice the required spatial resolution, and the pulse power should not exceed the SRS threshold.

On the other hand, the SRS power threshold increases as the pulse duration decreases. This is because SRS requires the co-propagation of the input light and the Raman Stokes light. These components have different wavelengths, meaning that, due to dispersion in the glass of the fibre, they travel at different speeds in the glass. If the input pulse is short, then the pulses will "walk off" over a certain distance and no longer overlap. The stimulated Raman process will then cease growing.

Although, the SRS power threshold may be higher for short pulses, the pulse energy is not optimised when the pulse width is significantly shorter than the spatial resolution.

This fourth aspect can overcome this limitation by using a long pulse train comprising a series of short pulses. This has the advantage of having a long pulse train width, and so a large energy, and the advantage of having short component pulses that may allow walk-off to occur.

According to this fourth aspect of the invention there is also provided an apparatus for generating and transmitting high energy optical pulses such that the excitation light energy is maximised while the stimulated Raman light is suppressed and for measuring the power of different components of backscattered light to enable the distributed measurement of temperature and/or loss over a long distance, which apparatus comprises at least one optical fibre which provides a scattering medium; an optical source; a means for generating a train of pulses by a modulating means, a pulse selection means or a conversion means to convert a single high power pulse into a train of pulses; an optical filtering means and one or more detectors for converting the optical signal into an electrical signal.

The use of a train of pulses in such a system has advantages in terms of extending sensing distance since SRS effects can be reduced as will be explained. The train of short pulses may be produced by directly or externally modulating light from a laser source. The pulse train may then be amplified using an optical amplifier to optimise the resultant pulse power for a given measurement length. Alternatively, a mode-locked laser with a pulse selector may be used to select a train of fast pulses.

However, high-power, short-pulsed lasers that use a Q-switching technique are more readily available. These lasers usually produce very high peak powers that can generate SRS over very short distances. In the prior art, the SRS was suppressed by significantly attenuating the laser power. This means that most of the available pulse energy is not used, so reducing the range that can be efficiently achieved.

Where a single high-power pulse is transformed into a train of lower power pulses, each of which will not exceed the SRS threshold, there is minimal wasted light as, although the power may be reduced, the pulse energy may be the same. This train should have a length near twice the required spatial resolution. For short input pulses, the SRS may be further suppressed by allowing space between the component pulses in the pulse train. This suppresses SRS by allowing walk-off to occur and by allowing the Raman scattered light to decay significantly before encountering the next pulse in the train.

As additional features for dependent claims, the optical fibre comprises lengths of different fibres to provide different Raman shifts down the length or to change the modal characteristics of the propagating light. This can enable backscatter from different lengths to be distinguished at the receiving means, or reduce the amount of interference. This can enable more than one pulse to be introduced in the fibre at one time, to increase the pulse repetition rate and so increase accuracy for a given measurement time.

As another such additional feature, the input light pulse is converted such that the resultant pulse train duration matches a spatial resolution required.

As another such additional feature, the pulse conversion means comprises one or more sets of splitting and recombining means each of which sends the input light pulse down two or more paths of different optical lengths and recombines the light to form a pulse train. This is one way of generating the train, which in some cases is more practical than generating the pulses at the optical source.

As another such additional feature, the pulse conversion means comprises optical fibre and optical fibre components. Such components can be robust and relatively inexpensive.

As another such additional feature, the pulse train duration and pulse train pattern resultant from the pulse conversion may be fixed or may be controlled by use of optical switches which select or deselect the number of pulse conversion means used and/or the paths used in the pulse conversion means.

As another such additional feature, the pulse train width and/or pattern and/or energy may be varied to help to correct for non-linearities when deriving the temperature and/or loss data or other sensed conditions.

As another such additional feature, one of, two of or all of the returning Raman Stokes, Raman anti-Stokes and Rayleigh signals may be compared to correct for any non-linearity in the signals when calculating temperature and/or loss.

According to a fifth aspect of the invention, there is provided a sensing system for sending and receiving optical signals along a waveguide for sensing conditions along the waveguide, the system having a transmitting means for sending pulses along the waveguide, a receiving means and the waveguide, the waveguide comprising a number of sections having different characteristics such that backscatter from the pulses has different optical properties, the receiving means being arranged to use the different optical properties to distinguish the backscatter from the different sections.

An advantage of this is that can enable backscatter from different sections to be distinguished at the receiving means, or can reduce the amount of interference between backscatter from the different sections. This can enable more accurate sensing, or can enable more than one pulse to be introduced in the fibre at one time, to increase the pulse repetition rate and so increase accuracy for a given measurement time.

As an additional feature for a dependent claim, the sections have waveguides providing different Raman shifts to provide backscatter components at different wavelengths. Such wavelength differences can be distinguished relatively easily at the receiving means without needing expensive additional components.

As another such additional feature, the sections having waveguides which cause different changes in the modal characteristics of the propagating light, to provide backscatter components with different modal characteristics. This is another way of achieving corresponding advantages, as an alternative or in combination with other ways.

Typically existing sensing systems throw away 90% of the energy in pulses output by the laser, to stay within the SRS limit. By providing wavelength discrimination filtering at the receiving means, it is possible to allow the SRS limit on power to be exceeded in some of the length of the waveguide, while reducing the interference that usually causes. For example, to take measurements at longer distances, the power can be set such that there are non-linearities in the first 10 km but readings can be taken for the next 1-5 km.

As an additional feature, there is a time gate for distinguishing the backscatter from a desire location along the waveguide. An advantage of this in combination with wavelength discriminating at the receiver is higher pulse repetition rates can be used to improve the signal averaging process.

Other aspects include the use of a reference section at a known temperature to receive the scattered components and to calibrate the amplitude of the scattered components.

Other aspects also include the use of a switch to send the pulses to at least two sensing fibres and or to both ends of the sensing fibres. A means for calibration the transmission wavelength and modal dependence of the switch, such as by using at least one reference section at a known temperature, may also be used to improve the accuracy of the temperature measurements between different sensing fibres.

Other aspects include corresponding methods of sensing using such apparatus, methods of offering a sensing service, methods of manufacturing a sensing system, and methods of producing sensor signals.

Other advantages will be apparent to those skilled in the art, especially in relation to other prior art not known to the inventors. Any of the additional features can be combined together and combined with any of the aspects, as would be apparent to those skilled in the art.

BRIEF DESCRIPTION OF THE DRAWINGS

Embodiments of the invention and how to put it into practice are described by way of example with reference to the accompanying drawings in which:—

DETAILED DESCRIPTION

Figure 1:
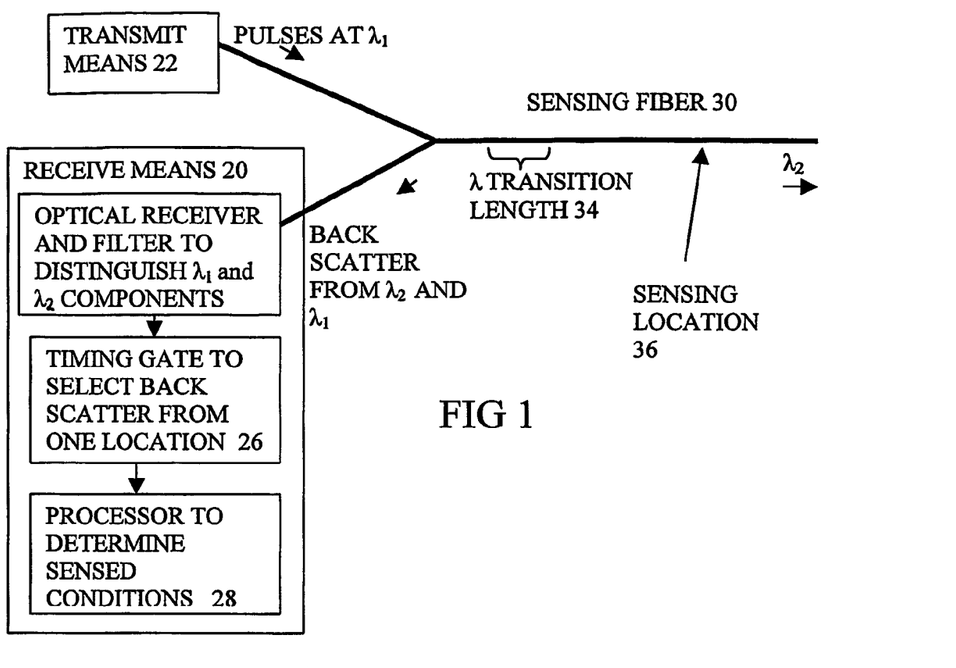
FIGS. 1 and 2 show embodiments of the invention including SRS wavelength conversion.

FIG. 1

FIG. 1 shows an embodiment of the invention. A transmitting means 22 is coupled to a sensing fibre 30 and sends pulses along the fibre at $\lambda_1$. The pulses are of sufficient power that SRS builds up along the fibre and causes wavelength conversion during the $\lambda$ transition length 34. The backscatter from all points of the sensing fibre is separated from the forward going light using conventional techniques, and fed to receiving means 20. This backscatter has Raman Stokes, Raman anti Stokes and Rayleigh components derived from both forward going wavelengths $\lambda_1$ and $\lambda_2$.

The receiving means has an overall purpose of outputting a sensed value or values of the conditions at a sensing location 36 at a given distance along the sensing fibre derived from the backscattered signal. This involves distinguishing the useful parts of the backscatter light and calculating the sensed value. In the example shown, there is an optical receiver 24 with an optional filter for separating the backscatter from $\lambda_2$ from other unwanted backscatter.

An electrical output from the receiver is output to a timing gate 26. The backscatter from each point in the sensing fibre takes a different time to get back to the receiver. The timing of the start and end of the timing gate can be carefully referenced to the time of the launch of the respective pulse to enable only the backscatter from the desired sensing location to pass. As shown, a processor 28 is used to calculate the sensed value from the filtered and selected components of the backscatter, as will be explained in more detail below. Usually this will involve taking an average of the signals from many pulses, to reduce the effect of noise. In principle, many variations of this arrangement can be envisaged. For example there may be no need for a filter at the optical receiver if only one pulse is in the fibre at any time. Having the filter can enable a succeeding pulse to be launched sooner, since there can be a pulse before the transition length and one after, and the filter can separate the backscatter components from each pulse.

Figure 2:
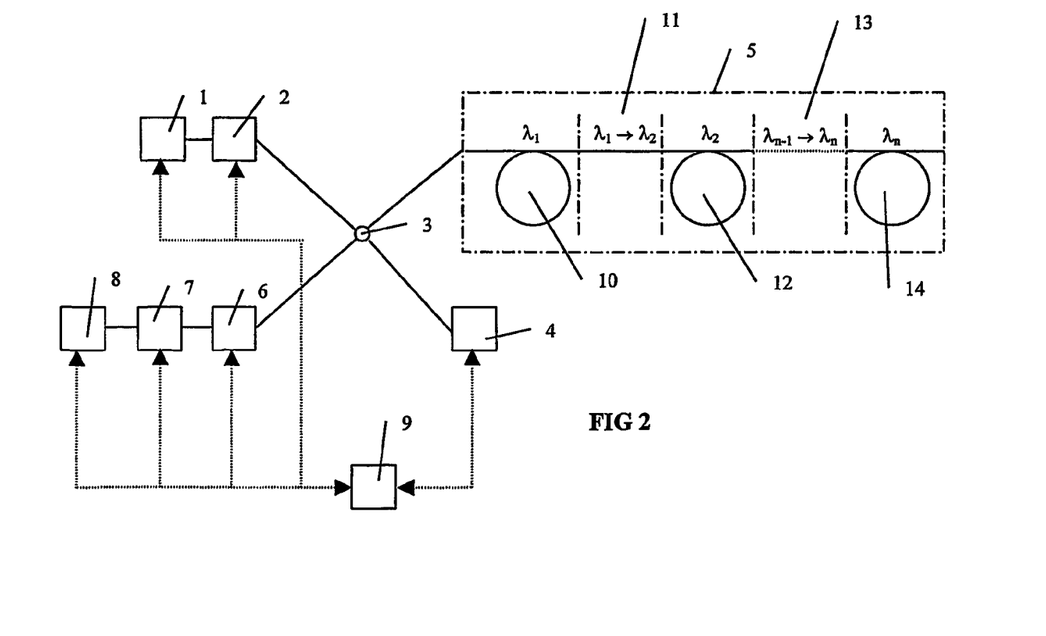

FIG. 2

FIG. 2 shows a diagram of another embodiment of the present invention, in which a pulsed laser source is used and only one end of the fibre is accessed. It shows how SRS enables different parts of the fibre to be illuminated with different wavelength light. A pulsed laser source (1), whose power, pulse repetition rate and pulse duration may be controlled, is connected to a splitting means (3) such as an optical coupler. An optical amplifier and/or attenuator unit (2) may be used to control the amount of optical power entering the system. The optical power may be monitored using a photodetector (4) in order to monitor the input power. The photodetector (4) may have a variable gain. Light from the splitting means (3) is sent into a length of fibre (5) which may be singlemode or multimode and may be polarisation maintaining and may comprise joined lengths of different fibres. Initially, the forward propagating light in the fibre (5) has the same wavelength as the source light, $\lambda_1$ (10). At some distance in the fibre, SRS is initiated and, over some transition distance (11), the forward propagating light transfers to a new wavelength $\lambda_2$. The forward propagating light then continues travelling through the fibre with wavelength $\lambda_2$ (12).

At some further point(s) SRS may again be initiated over some transition distance(s) (13) to produce forward propagating light with a new wavelength(s) (14). The backscatter light generated by all the forward propagating components in the fibre (5) returns to the splitting means (3) and may be sent to an attenuator and/or amplifier unit (6). The light is then sent to the filtering unit (7), which may be an apparatus that selects one of a number of filters to place in the optical path. Light selected by the filtering unit is detected by a photodetector (8) that may have a variable gain. A processing unit (9) analyses the signal from the signal photodetector (8) and controls the filters chosen by the filtering unit (7). The processing unit may also analyse the signal from the monitor photodetector (4), and/or control the gain of the monitor photodetector, and/or control the gain of the signal photodetector (8), and/or control the laser's (1) power, and/or repetition rate, and/or pulse width, and/or control the amount of amplification and/or attenuation from either or both of the amplification and/or attenuation units (2 & 6).

In use, the laser sends pulses into the optical fibre, where SRS is generated in at least one position. The returning signal is collected and recorded as a function of time for each of the wavelengths selected by the filtering unit. Each selected wavelength corresponds to a signal of interest in the backscatter spectrum and, by analysing these signals, the temperature and/or loss at all points along the fibre is determined.

Using the non-linear effects in the fibre can optimise the measurement of the weak signals generated throughout the fibre. As the input optical power is increased, at some point in the fibre SRS translates the input light to a longer wavelength after a certain interaction length. This process may be repeated further along the fibre such that different parts of the fibre are illuminated by different wavelengths. The point of transition along the fibre can be adjusted by altering the input power.

Pulsed light from a laser is sent via a splitting means into an optical fibre. The light propagates down the fibre and, as it does so, it generates Raman Stokes and anti-Stokes and Rayleigh backscattered light. This backscattered light is separated into its spectral components, for example using filters, wavelength division multiplexing couplers or a combination of couplers and filters, and is detected and analysed. The analysis of this data allows the temperature distribution and/or loss distribution or other conditions along the fibre to be derived.

At a certain distance in the fibre, the Raman process becomes non-linear and the forward travelling Stokes light becomes stimulated. Here, after a short transition length, the source optical power is transferred to the Stokes wavelength that then illuminates the remaining length of fibre. The instrument then treats this new wavelength as the source light and collects and analyses the Raman Stokes and anti-Stokes and Rayleigh wavelengths relative to this new secondary light. The new forward travelling Stokes signal may itself become stimulated and so repeat the process further along the fibre. Again, here, the new wavelength is treated like as the source and the Raman Stokes and anti-Stokes and Rayleigh wavelengths relative to this are collected and analysed. This process may be repeated many times along the length of the fibre.

In this way, the fibre is in effect segmented such that there is a different source wavelength in each segment. Because of this, it is only required that there is only one pulse in each segment (as opposed to one pulse in the whole fibre) to avoid or reduce interference. It may be desirable to collect the data from each segment independently and, here, it is only necessary for there to be one pulse in the segment currently under examination. Also, because the system willfully exceeds the SRS limit, the returning signals have a higher power than if the SRS limit were not exceeded.

When the light shifts from the initial wavelength to the new Stokes wavelength (which now becomes the new source), the initial wavelength now coincides with the new anti-Stokes wavelength. This may lead to crosstalk between the new anti-Stokes wavelength and the Rayleigh scattering from any of the initial source light that is still propagating. This can be countered by choosing appropriate filters in the receiver such that, in this example, the new anti-Stokes signal is collected at a slightly different wavelength than the old Rayleigh signal. This approach can work because, although the stimulated Stokes light becomes spectrally very narrow, the much lower-powered spontaneous light is spectrally very broad. It is only necessary to collect the light at some part of this spectrum and so it is possible to choose the part that does not overlap with another component of the backscattered signal, if required.

The power of the backscattered components will be dependent upon the temperature at the position where they were generated, the degree to which the source light is attenuated and any non-linear growth of the signals themselves. The Raman Stokes, Raman anti-Stokes and Rayleigh signals may be combined using algorithms to deconvolve these effects for the determination of the temperature and/or loss. Analysing data collected for different input powers may also be useful in deconvolving the temperature and/or loss data. At regions over which the Stokes signal becomes stimulated (these regions are typically relatively short), it may be difficult to reliably use these algorithms. To counter this, these regions can be moved along the fibre by altering the input power. By performing a number of measurements with different input powers, the system may thus correct for non-linearities and so allow the temperature and/or loss data to be reliably obtained.

The optical fibre may be singlemode, multimode or may be mixed singlemode and multimode for the different propagating wavelengths, and may have tailored doping levels, or many different doping layers, to optimise the interactions.

The optical source power may be varied to help to correct for non-linearities when deriving the temperature data and to change the position, or positions, in the fibre at which the Stokes signal becomes stimulated. The filtration may be chosen such that the Stokes and/or anti-Stokes and/or Rayleigh signal components from each section of the fibre may be collected without significant overlap from the equivalent components generated in the other sections.

One of, two of or all of the returning Raman Stokes, Raman anti-Stokes and Rayleigh signals may be compared to correct for any non-linearity in the signals and to correct for any overlap between the signals from one segment and the signals from another and for calculating the temperature and/or loss.

Figure 3:
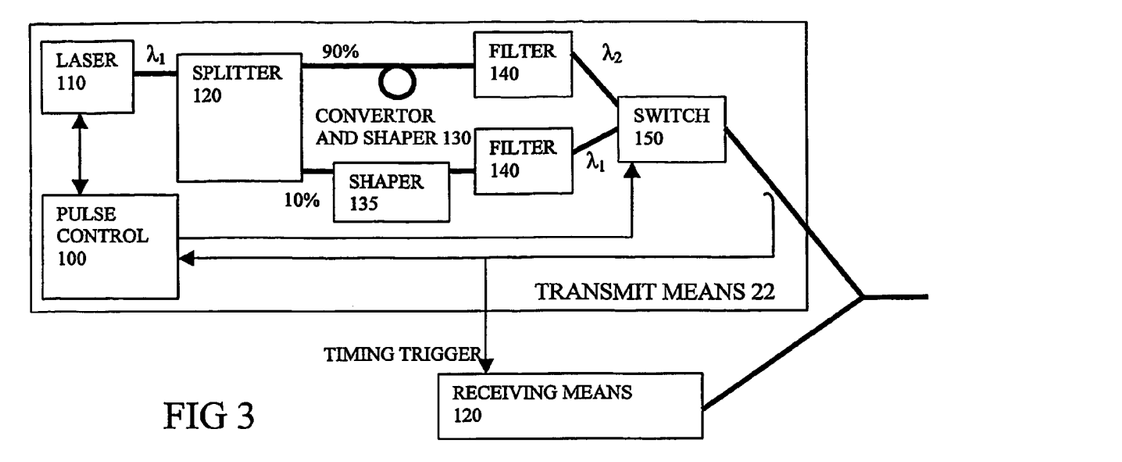
FIGS. 3 and 4 show embodiments of the invention showing arrangements of the transmitting means.

FIG. 3

FIG. 3 shows in schematic form another embodiment showing an example of a transmitting means for use in the embodiment of FIG. 1 or 2 or other embodiments. It is notable for enabling transmitting pulses at two or more wavelengths, to enable correction in the receiving means for differential loss in the fibre. Differential loss, meaning different losses along the fibre for different wavelengths, can be significant where long distances, e.g. kms of fibre are involved, and where the sensing relies on backscatter components at more than one wavelength. This is the case for sensing temperature for example, where the temperature value is calculated from a ratio of any two or more of the Raman Stokes, Raman anti Stokes and Rayleigh components of the backscatter from a single forward going wavelength.

To correct for such differential loss, pulses at two or more wavelengths are used. If the Raman Stokes backscatter component from a higher wavelength pulse is compared to the Raman anti Stokes backscatter component from a lower wavelength pulse, then the respective loss components can be cancelled out. Hence errors from differential loss can be removed. To generate pulses at two or more wavelengths, it is possible to use two separate sources, such as micro chip lasers, but FIG. 3 shows an example of how a single laser can be used to generate the pulses at both wavelengths. Laser 110 generates pulses under the control of a pulse timing control part 100. This can be implemented by conventional electronic circuitry such as a microprocessor for example. The pulses generated are relatively high power, to enable SRS conversion e.g. 10 kW peak, <1 nsec long and having energy in the region of 10 µJ. The pulses are split into two streams by a splitter 120. 90% of the energy is passed to the first stream, and 10% to the second stream. This is done to overcome greater losses to the first stream caused by a converter and shaper 130.

The converter and shaper are for converting the wavelength of the pulses of the first stream from $\lambda_1$ to $\lambda_2$. As in other embodiments, these wavelengths can be 1064 nm and 1115 nm respectively. The converter can be implemented as a length of fibre, e.g. 500 m, or whatever is a sufficient length for the SRS conversion to take place, which will depend on the power and the fibre characteristics amongst others. The pulse shaping is for the purpose of spreading the pulse to make it longer and to enable more energy to be retained in the pulse at lower peak powers. This can be carried out by a dispersive element providing modal dispersion, in other words, different delay for different propagating transmission modes. This can be incorporated in the characteristics of the same fibre, or by providing an element such as a step index multimode fibre, following established practice. Filters 140 are provided optionally before or after the two streams are recombined by the combiner in the form of a switch 150 or other type of combiner. The filters are useful for selecting the scatter wavelength and removing other unwanted components.

The output of this combiner is a stream of pulses of two different wavelengths. The pulses should have the same power and other characteristics. The switch can control the sequence of pulses in various forms, there should be equal numbers of pulses of each wavelength, and the receiving means 120 should be alerted to the sequence, and timing of the pulses, e.g. by the timing control part 100 as shown. Other ways can be envisaged. Some parts are not shown or are optional. For example, not shown is an attenuator for controlling the power level of the pulses. This could be implemented at various places in the optical paths, and controlled by microprocessor for example. An advantage of a single source is that the timing and power of the pulses of the two or more wavelengths is inherently related. Long and short term variations in laser characteristics need not be matched or corrected, leading to simpler and more cost effective devices or higher quality outputs.

A small part of the output pulse is tapped off for use as a timing trigger. This can be fed to the receiving means as shown, to synchronise the timing gate in the receiving means. Optionally this could be tapped off at other places, or driven electrically from the pulse control means, but an optical tap after the optical signal components in the transmit means can be more accurate and avoid the need to account for delays in the transmit means. The optical tap can be fed back to the pulse control means to give some feedback about the output pulse timing and shape if desired, for monitoring or control purposes.

Figure 4:
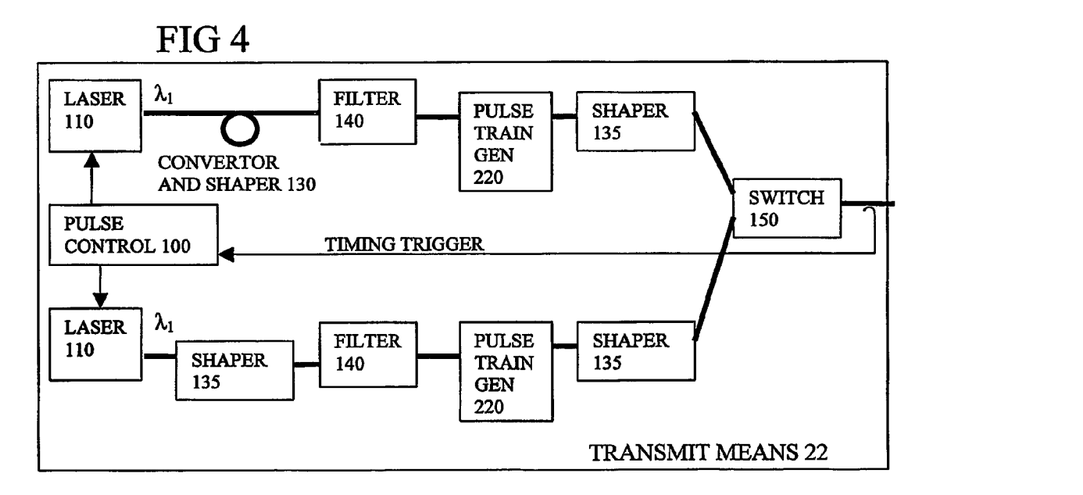

FIG. 4

FIG. 4 shows an alternative arrangement for the transmitting means according to an embodiment. Again the purpose is to provide pulses at two wavelengths to enable the receiving means (not shown) to correct for differential loss. In this case, two lasers 110 are provided to output light for the pulses, under the control of pulse control means 100. This may be implemented by a conventional microprocessor for example. Initially the pulses are at the same wavelength, but a converter and shaper 130 is provided to change the wavelength of one of the streams. As in FIG. 3, filters 140 can be provided optionally to clear the signals of unwanted scatter components. Then, to shape the pulses, a pulse train generator 220 and a shaper element 135 are provided. The pulse train generator converts each pulse into a train of pulses by a series of splitters, delays and combiners. It is described in more detail below with reference to FIGS. 8 to 12. This spreads the pulse out in time. Then the shaper can spread each of the pulses in the pulse train, to merge them back into a single long pulse. Again the purpose is to lengthen the pulse to enable it to retain more energy, either for use in the sensing fibre below the SRS limit, or for use in a system such as shown in FIG. 1 or 2. By using a pulse train generating means, the shaper need do less spreading, and so its optical dispersion characteristics need not be so extreme. Thus the shaper can be manufactured more easily and/or the final pulse shape can be spread more evenly. As in FIG. 3, a switch is provided for combining the two streams. As before, an optical timing trigger is tapped off.

Figure 5:
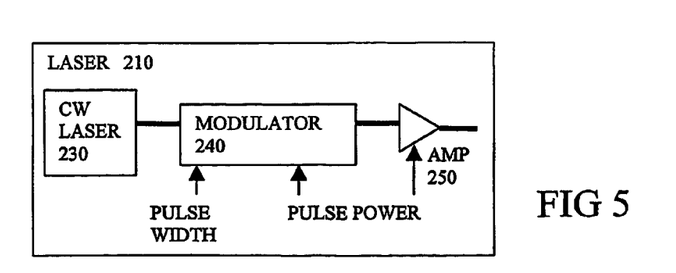
FIG. 5 shows a possible arrangement of a laser to generate pulses.

Spreading a short pulse typically less than 1 nsec into a pulse of tens of nsecs is an unusual step and helps enable use of short pulsed solid-state micro chip lasers. Such lasers are good at producing sufficient peak power (e.g. 10 kW) efficiently, but having a short cavity means it is hard to produce long pulse. An alternative would be to use active Q switched lasers rather than passive devices. But passive devices are much preferred for being more robust and less expensive.
FIG. 5

FIG. 5 shows an example of an externally modulated laser. This can be used as an alternative to directly modulated micro chip lasers for producing the pulses. To form the pulses from a continuous wave output, modulators 220 are provided, controlled by the pulse control part 100 of FIG. 3 or 4 for example. Optical amplifiers 230 are provided at the output of the modulators for increasing the power, and actively controlling the power levels to ensure they are the same for both wavelengths. A pulse timing signal can be fed to the modulator, while pulse power can be controlled by any of the three components in principle. Although more complicated, the arrangement of FIG. 5 has some advantage in terms of ease of control of the pulse shape.
FIGS. 6, 7

Figure 6:
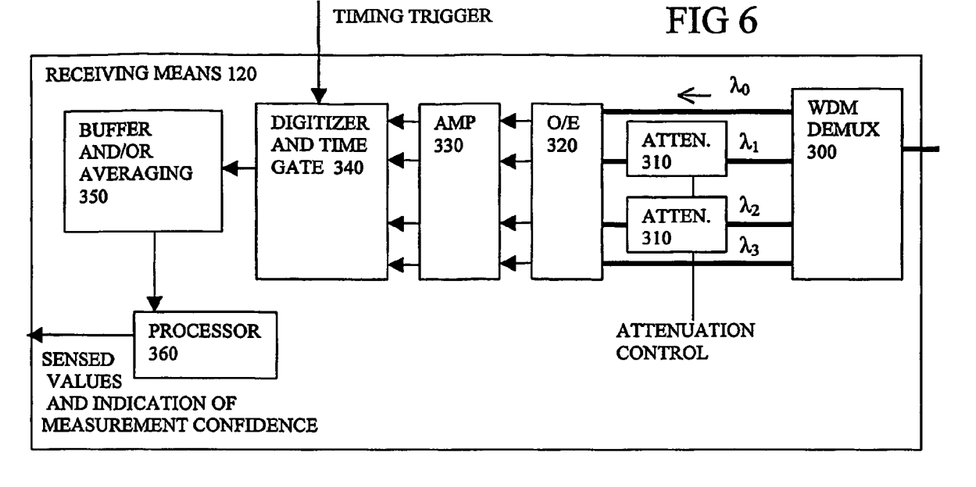
FIG. 6 shows a view of a receiving means according to an embodiment, for use in the system of FIG. 1 or 2 or 3 or other embodiments.
Figure 7:
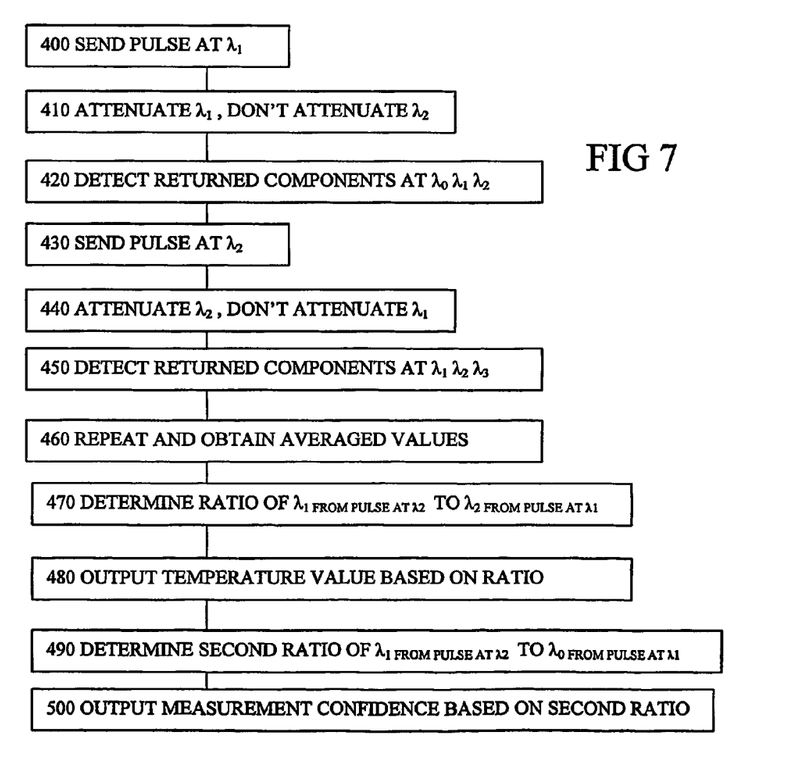
FIG. 7 shows a schematic view indicating operations of the receiving means according to an embodiment of the invention.

FIGS. 6 and 7 show an arrangement of one possible implementation of a receiving means and operational steps of the receiving means respectively. Incoming optical backscatter signals are fed to a WDM (Wavelength division multiplex) demux device 300. This is arranged to separate the various components by wavelength. These can be implemented by commonly available devices. Four separate outputs are shown, though there could be more. Four outputs enables separation of the 3 backscatter components for pulses of two different wavelengths. Attenuators 310 are provided to attenuate the Rayleigh component as this can be much brighter than the others, to avoid damage to detectors. The attenuators can be switched according to which wavelength pulse is being received.

Optical to electrical conversion O/E 320 is carried out by photodetectors for each wavelength. Analog electrical signals are amplified by amplifiers 330, before being fed to a digitizer and time gate 340. This outputs digital values sampled at given instants at a sampling frequency at least twice the highest frequency of the signal, and during a window of time set by the timing trigger signal sent from the transmitting means. Digital streams of data are sent on to the buffer and/or averaging part 350 which feeds values or averaged values to the processor 360. The processor can be implemented in the form of a PC (personal computer) or other conventional hardware circuitry located locally or remotely for example. The processor outputs sensed values and an indication of measurement confidence for example.

As shown in FIG. 7, at step 400, a pulse at $\lambda_1$ is transmitted. At step 410 or earlier, the attenuators are switched to ensure only $\lambda_1$ is attenuated. At step 420, returned Raman Stokes and Raman anti Stokes components at $\lambda_0$ $\lambda_2$ are detected. At steps 430 to 450, corresponding steps are carried out for a pulse at $\lambda_2$, and Raman Stokes and Raman anti Stokes components at $\lambda_1$ $\lambda_3$ are detected. These steps are all repeated to obtain averaged values of the backscatter components. The measurements can be repeated at different pulse power levels to enable some correction for some non-linearities.

At step 470 a ratio of $\lambda_{1\ FROM\ PULSE\ AT\ \lambda 2}$ to $\lambda_{2\ FROM\ PULSE\ AT\ \lambda 1}$ is obtained by the processor. This can enable temperature to be determined with differential losses cancelled out as explained above. Other ratios or calculations can also be determined by the processor. For example, if the pulse power is sufficiently high that the backscatter components vary in a non-linear fashion, then two components varying in opposing manners can be combined mathematically to give a value which does have an approximately linear relationship with the condition being measured. In this way, at step 480, an output temperature value, or other condition, can be output, based on the above mentioned ratio, and corrected for various errors such as non-linearities.

Figure 8:
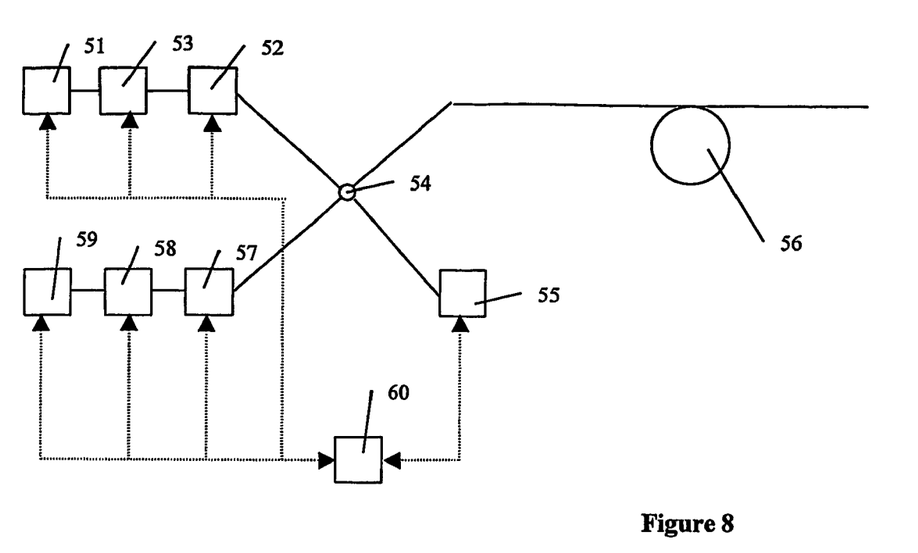
FIGS. 8, 9 and 10 show embodiments of the invention using conversion of a pulse into a pulse train before sending along the fibre.

At step 490, optionally a second ratio can be determined, to assess an error level such as the amount of differential loss. This is useful to see if the fibre or other parts have deteriorated, and to output a level of confidence in the measurement. This is particularly useful where the fibre is inaccessible, and where the measurements are critical for safety reasons for example. To achieve this, a ratio of $\lambda_{1\ FROM\ PULSE\ AT\ \lambda 2}$ to $\lambda_{0\ FROM\ PULSE\ AT\ \lambda 1}$ can be used for example.
FIG. 8

FIG. 8 shows a diagram of an embodiment of the present invention for distributed measurements, in which light from a laser source is converted into a train of pulses and only one end of the fibre is accessed. A laser source (51) is connected to a pulse conversion means (52) which turns the input light into a train of pulses. This pulse train is then sent to a splitting means (54) such as an optical coupler, which may be incorporated in the pulse conversion apparatus. An optical amplifier and/or attenuator unit (53) may be used to control the amount of optical power entering the system. The optical power may be monitored using a photodetector (55) in order to monitor the input power. The photodetector (55) may have a variable gain. Light from the splitting means (54) is sent into a length of fibre (56) which may be singlemode or multimode and may be polarisation maintaining and may comprise joined lengths of different fibres. The backscatter light generated by the forward propagating pulse train in the fibre (56) returns to the splitting means (54) and may be sent to an attenuator and/or amplifier unit (57).

The light is then sent to the filtering unit (58), which may be an apparatus that selects one of a number of filters to place in the optical path or may comprise a splitting means, such as a coupler, that splits the light into two paths for separate filtering and detection. Light selected by the filtering unit is detected by a photodetector (59), or photodetectors, that may have a variable gain. A processing unit (60) analyses the signal from the signal photodetector (59), or photodetectors, and may control the filters that may be chosen by the filtering unit (58). The processing unit may also analyse the signal from the monitor photodetector (55), and/or control the gain of the monitor photodetector (55), and/or control the gain of the signal photodetector (59), or photodetectors, and/or control the laser's (51) power, and/or repetition rate, and/or pulse width, and/or control the amount of amplification and/or attenuation from either or both of the amplification and/or attenuation units (53 & 57) and/or control the pulse train width and shape using pulse conversion (52).

In use, the light from a laser is sent into the pulse conversion means that produces a train of pulses that are sent into the sensing fibre where they generate a backscattered signal. The backscattered signal is collected and recorded as a function of time for each of the wavelengths selected by the filtering unit. Each selected wavelength corresponds to a signal of interest in the backscatter spectrum and, by analysing these signals, the temperature and/or loss at all points along the fibre is determined.

The train of pulses may be efficiently generated by passing the input light pulse into a splitting means that directs a fraction of the light into two or more paths, each of a different length. The pulses travelling down these paths are then recombined at a combining means and directed down a common path. Since each pulse travelling down each path travels a different distance, the pulses recombine to form a train of pulses. By changing the length differences and number of paths, a wide variation in resultant train duration and shapes may be obtained. In addition, a number of pulse conversion means, as described here, may be combined one after another. An advantage here is that the pulses may be sent down fewer paths at each splitting element to achieve the same goal, and, due to the nature of the splitting means that may be used, this may minimise the losses at the recombining means. Also, the resultant pulse train duration and shape may be tailored by including optical switches in the arrangement such that the number of paths and/or conversion means may be chosen. This allows the width of the train to be adjusted to match the required spatial resolution and allows pulses to be added and removed from the train if required, for example, to further dampen SRS by adding more space between pulses. Pulses may also be removed to make a train with a more complicated pulse pattern. This pattern may, for example, reflect some known periodicity in the structure to be measured, giving a higher signal power than that produced by a single pulse, without adding any measurement ambiguity.

For distributed measurements, light from a laser is converted into a train of pulses such that the train width is optimum for the spatial resolution required. The train may also be formed such that there is space between the component pulses to allow walk-off. This pulse train is sent via a splitting means into an optical fibre. The light propagates down the fibre and, as it does so, it generates Raman Stokes and anti-Stokes and Rayleigh backscattered light. This backscattered light is separated into its spectral components, for example using filters, wavelength division multiplexing couplers or a combination of couplers and filters, and is detected and analysed. The analysis of this data allows the temperature distribution and/or loss distribution along the fibre to be derived.

The optical fibre may be singlemode or multimode and may have tailored doping levels, or many different doping layers, to optimise the interactions. The optical fibre may be polarisation maintaining to provide a more controlled interaction. The optical fibre may comprise lengths of different fibres to provide different Raman shifts down the length or to change the modal characteristics of the propagating light.

The splitting ratio of the splitting means may be wavelength or modal dependent so as to improve the power transfer of the input and backscattered light. The returning light may be amplified and/or attenuated to enhance the detection efficiency. The optical source may be Q-switched, mode-locked, directly pulsed or externally pulsed. The input light pulse may be converted such that the resultant pulse train duration matches the spatial resolution required.

The pulse conversion means may comprise one or more sets of splitting and recombining means each of which sends the input light pulse down two or more paths of different optical lengths and recombines the light to form a pulse train. The splitting and recombining means used in the pulse conversion means may be one of, or a combination of, normal couplers, singlemode couplers, multimode couplers or polarisation mode couplers.

The pulse conversion means may comprise optical fibre and optical fibre components. The pulse train duration and pulse train pattern resultant from the pulse conversion may be fixed or may be controlled by use of optical switches which select or deselect the number of pulse conversion means used and/or the paths used in the pulse conversion means. The space-to-mark ratio between the pulses in the pulse train may be selected such that stimulated Raman scattering is further suppressed by inducing walk-off between the pulses and the scattered Raman light. The pulse train width and/or pattern and/or energy may be varied to help to correct for non-linearities when deriving the temperature and/or loss data.

The source power may be varied directly or by an attenuating or amplifying means. The filtration may be achieved using optical filters, variable optical filters, wavelength division multiplexing couplers or a combination of couplers and filters.

One of, two of or all of the returning Raman Stokes, Raman anti-Stokes and Rayleigh signals may be compared to correct for any non-linearity in the signals when calculating the temperature and/or loss. Measurements from both ends of the fibre may be used to allow better calibration of the fibre. The fibre ends may be index matched and/or angle cleaved to prevent end reflections.

The optical signals are converted to electrical signals using photodetectors, photodetector arrays, avalanche photodiodes, single photon counting detectors or multi-photon counting detectors, and are fed into a processor and recorded in the desired form. A processor can be used to control the operation of the components of the system.

Figure 9:
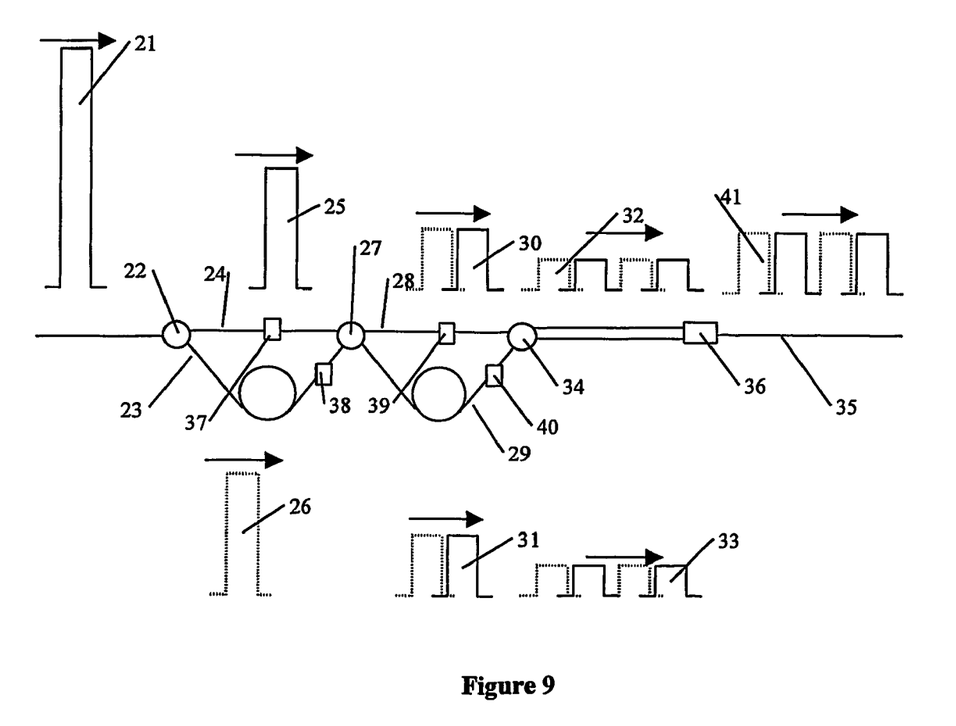

FIG. 9

FIG. 9 shows an embodiment of a pulse conversion means for use as a pulse shaper. It can be fed by a pulsed laser, with two delay-line stages in series to convert the input pulse to a train of four pulses. Referring to FIG. 7, a high power pulse (21) is sent to a splitting means, such as an optical coupler (22) which directs the light into, here, two paths, one of which (23) has a longer optical path length than the other (24). Here, the splitting ratio is such that an equal proportion of the input light is sent into each path and the difference in the path lengths is greater than the input pulse length. The light pulses in each of the two paths have half the height of the input pulse, but the same width (25 & 26). The pulses then pass to a recombining means (27) which, here, is an optical coupler. The same coupler (27) then splits the light into two paths (28 & 29) and the process is repeated with each path transmitting a pulse train which comprises two pulses each of which is the same width and a quarter of the height of the input pulse (30 & 31). The two path lengths now differ by over twice the input pulse width such that when the two paths recombine the resultant pulse trains (32 & 33) each comprise four pulses each of which is the width and an eighth of the height of the input pulse. The resultant pulses may be combined together into one fibre using a recombining means (36), which may be the same as recombining means (34), and may be a coupler that efficiently combines the light from the two or more paths. For example, this could be a modal coupler combining the output of several small core fibres into a larger core fibre or it could be a polarisation beam coupler. The resultant pulse train (41) in the output fibre (35) has a quarter of the height and more than four times the width of the input pulse (21). If required, more conversion elements than the two shown in FIG. 2 may be used. In addition, switches (37, 38, 39 & 40) may be used to stop light passing through one or more of the paths. The result of this would be to control the width of the pulse train and/or change the shape of the pulse train by removing component pulses. For example, if Switch (40) were set to block off light, then the output of the conversion apparatus would be a pulse train one quarter of the height and more than twice the width of the input pulse. Whereas if Switch (40) were set to transmit light then the output would be a pulse train one quarter of the height and over four times the width of the input pulse.

Figure 10:
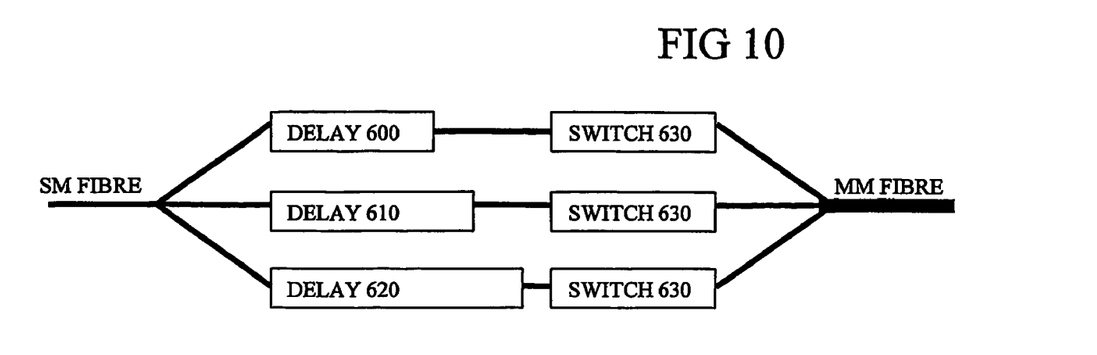

FIG. 10

FIG. 10 shows another example of a pulse shaper arrangement to create a train of pulses from a single input pulse. A single mode fibre is used at the input, and is coupled to three further single mode fibres to split the incoming pulse into three approximately equal parts travelling on separate paths. Of course there could be more paths depending how much pulse spreading is required. Each path has a different delay provided by delays 600, 610 and 620. These can be implemented in the form of different lengths of fibre, and optionally can be arranged to have a controlled amount of dispersion to achieve some pulse spreading. An optical switch 630 is provided in each branch. The single mode fibres carrying each path are coupled into one multimode fibre to recombine the differently delayed pulses. The optical switches can be controlled to control the length of the pulse train, and the amount of overlap or the gap between the pulses of the train. The use of single mode and multimode fibre in this way can enable the splitting and recombining to be carried out with a minimum of loss. If desired, further control over the shape of the pulse can be achieved by having controllable attenuators or amplifiers in some or all of the branches. Each branch can itself be split into a number of sub branches, or a cascade of the arrangements can be created. The arrangement of FIG. 9 could be combined with the arrangement of FIG. 10, to create any type of cascaded or sub branched layout.

Figure 11:
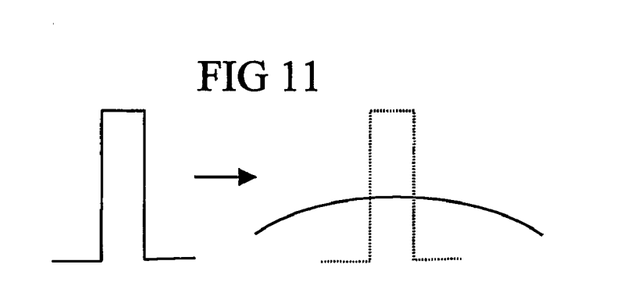
FIGS. 11 and 12 show schematically how a pulse can be shaped or converted to a pulse train then shaped.
Figure 12:
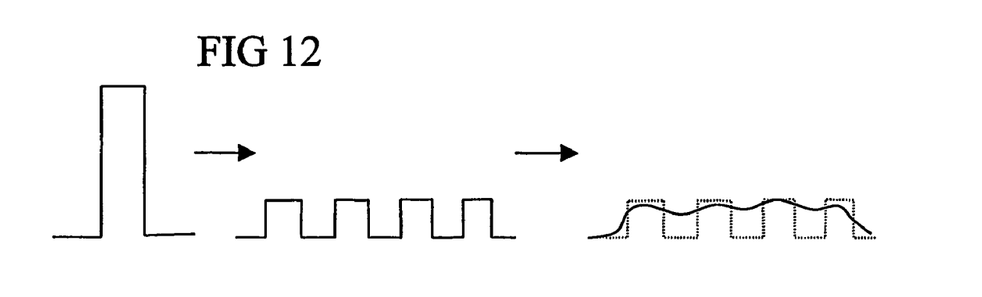

FIGS. 11 and 12

FIG. 11 shows a graphical representation of how an input pulse is spread by the effect of a dispersive element, as is known. The amount of spreading is limited and the output is not spread evenly, more power is concentrated near the centre. FIG. 12 shows graphically how a pulse is spread by the arrangement of FIG. 9 or 10 or other embodiment of a pulse conversion means or pulse shaper. The effect of splitting, delaying and combining to create a train of pulses is shown as a first step. The effect of providing some dispersion to spread the pulses is shown as a second step. The dispersion can be provided before the splitting, or after the splitting, or after the combining for example, the end result is similar. In a typical example, an input pulse of less than 1 nsec width is converted to a pulse having a width of tens of nsecs. Spreading the pulses, and of merging them to convert the train to a single long pulse can be achieved by multimodal effects, for example by using a step index multimode fibre, having different paths for different modes. By filling all the gaps in the train and making a single long pulse, more energy is provided for given peak power than if the gaps are not filled in. By generating a pulse train, less spreading is needed, so for example a dispersive element having only 500 m of fibre may replace one having 5 km. This can reduce bulk and cost and reduce losses.

CONCLUDING REMARKS

Although described with reference to light as an example though clearly it is intended to encompass other parts of the electromagnetic spectrum having similar characteristics which enable corresponding advantages to those set out above to be achieve. Although described with reference to sensing temperature or loss, clearly it is not intended to limit to such applications, and it is conceivable to use the various aspects in other applications.

A method and apparatus for generating and transmitting high energy optical pulses are described. Distributed temperature sensors usually use Raman scattering in optical fibres as the means to determine the temperature. Here, light from a laser source is sent down a fibre and the small amount of light that is scattered back towards the source is analysed. As the fibre length increases, the resolutions of the temperature and loss measurements become poorer. This is because losses in an optical fibre attenuate the signal. An obvious solution to this problem is to launch more light into the fibre to compensate for the losses but stimulated Raman scattering limits how much light may be launched. The present invention solves this problem by using a pulse conversion method to maximise the resultant pulse energy while the power is kept below SRS threshold.

The invention claimed is:

1. A sensing system for sending electromagnetic signals along a waveguide and sensing conditions at one or more sensing locations along the waveguide, the system comprising a transmitting means and a receiving means, wherein the transmitting means is arranged to generate two or more streams of pulses having spatially separate paths, the pulses of one of the streams having a suitable shape to cause a controlled conversion of the pulses to a different wavelength, before combining the streams to form a combined stream and sending the combined stream along the waveguide, and the receiving means is arranged to receive signals returned from the one or more sensing locations, by detecting an up shifted component returned from one of the pulses at a first wavelength, and a down shifted component returned from one of the pulses transmitted at a higher wavelength, down shifted to the first wavelength and the receiving means is adapted to compensate for different losses along the waveguide at different wavelengths and determine the conditions based on the received signals.

2. The system of claim 1, the transmitting means comprising an optical source for generating the pulses; a splitter arranged to split the pulses into two or more streams, and a convertor for converting the wavelength of one of the streams by a stimulated inelastic scattering process before sending the combined stream along the waveguide towards the sensing location.

3. The system of claim 1 comprising any one or more of: a pulse shaper for lengthening the pulses before sending along the waveguide; a dispersive element for lengthening the pulses; a step index multimode fiber element for lengthening the pulses; and a pulse train converter for converting each pulse into a train of pulses, followed by a dispersive element for shaping the train of pulses.

4. The system of claim 1, the transmitting means comprising a laser, a modulator for producing pulses from the laser output, and an optical amplifier for amplifying the pulses.

5. The system of claim 1, the transmitting means comprising at least a first optical source for generating a first stream of pulses and a second optical source for generating a second stream of pulses, and a convertor for converting the wavelength of the first stream of optical pulses by a stimulated inelastic scattering process before sending the streams along the waveguide towards the sensing location.

6. A sensing system for sending electromagnetic signals along a sensing waveguide and sensing conditions at one or more sensing locations along the sensing waveguide, the system comprising a transmitting means arranged to transmit pulses of suitable shape to cause a controlled conversion of the pulses to a different wavelength by a stimulated inelastic scattering process in the sensing waveguide before reaching a first sensing location, the system comprising a receiving means arranged to receive signals returned from the first sensing location, and to determine the conditions based on the received signals, the power of the pulses being such that the different wavelength undergoes one or more further conversions to further different wavelengths by a stimulated inelastic scattering process beyond the first sensing location such that different parts of the sensing waveguide are illuminated by different wavelengths, and the receiving means is arranged to distinguish the returning optical signals at each of the different wavelengths.

7. The system of claim 6, having a controller arranged to carry out any one or more of the following: adjusting the pulse power to move a transition length where the converting takes place, to a different part of the waveguide; controlling a pulse repetition rate.

8. The system of claim 6 having any one or more of: a pulse shaper for lengthening the pulses before sending along the waveguide a dispersive element for lengthening the pulses; a step index multimode fiber element for lengthening the pulses; and a pulse train converter for converting each pulse into a train of pulses, followed by a dispersive element for shaping the train of pulses.

9. The system of claim 6, the receiving means being additionally arranged to receive signals returned from one or more nearer sensing locations, before a location of the conversion.

10. The system of claim 6, the transmitter means being arranged to initiate one or more generations of stimulated Raman light such that different parts of the waveguide can be illuminated by different wavelengths, and arranged to transmit more than one pulse in the waveguide at the same time; and the receiving means having optical filtering means to distinguish different components of backscattered light and one or more detectors for converting the filtered optical components into electrical signals.

11. The system of claim 6, the receiving means having any one or more of the following: filters arranged such that a desired backscattered signal is collected at a slightly offset wavelength compared to a wavelength of the transmitted pulses before wavelength conversion; filters arranged such that Raman Stokes and/or Raman anti-stokes and/or Rayleigh signal components backscattered from one section of the waveguide are collected without significant overlap from equivalent components backscattered from other sections; a non-linearity correction arrangement arranged such that one of, two of or all of the returning Raman Stokes, Raman anti-Stokes and Rayleigh signal components are compared to correct for any non-linearity in the signals, and a non linearity correction arrangement arranged to use a combination of the returning Raman Stokes, and Raman anti-Stokes components which are in a saturated, non linear region of their relationship to the sensed condition, to compensate for the non linearities.

12. A sensing system for sending electromagnetic signals along a waveguide and sensing conditions at one or more sensing locations along the waveguide, the system having a receiving means and a transmitting means having a source for generating a stream of pulses, a splitter arranged to split the pulses into two or more streams, and a convertor for converting the wavelength of one of the streams to a different wavelength, before sending the streams along the waveguide, the receiving means being arranged to receive signals returned from the sensing location, and to determine the conditions based on the received signals, the receiving means being arranged to compensate for different losses along the waveguide at different wavelengths by detecting an up shifted component returned from one of the pulses at a first of the wavelengths, and a down shifted component returned from one of the pulses transmitted at a higher of the wavelengths, down shifted to the first wavelength.

13. The system of claim 12, the source and splitter being arranged to provide sufficient power in the pulses reaching the convertor such that the conversion is carried out by stimulated inelastic scattering.

14. The system of claim 12, further comprising any one or more of: a pulse shaper for lengthening the pulses before sending along the waveguide; a dispersive element; and a pulse train converter for converting each pulse into a train of pulses, followed by a dispersive element for shaping the train of pulses.

15. Apparatus for generating and transmitting high energy optical pulses along a waveguide which provides a scattering medium which apparatus comprises an optical pulse generator for generating the high energy optical pulses, an optical arrangement for lengthening a duration of each pulse located before the waveguide to reduce a peak power such that stimulated Raman light is suppressed while maintaining pulse energy for transmission along the waveguide, and a receiver for measuring different components of backscattered light from the waveguide for remote sensing.

16. Apparatus as claimed in claim 15 in which the waveguide comprises lengths of different waveguides to provide different Raman shifts down the length or to change the modal characteristics of the propagating light.

17. Apparatus as claimed in claim 15 in which the amount of lengthening corresponds to a spatial resolution required.

18. Apparatus as claimed in claim 15 in which the arrangement for lengthening comprises any one or more of the following: a dispersive element; a step index multimode fiber element; a pulse train converter for converting each pulse into a train of lower power pulses, followed by a dispersive element for shaping the train of pulses into a lengthened pulse; one or more sets of splitters and recombiners each of which sends the input light pulse down two or more paths of different optical lengths and recombines the light to form a pulse train; and optical fibre and optical fibre components; an arrangement in which the pulse train duration and pulse train pattern resultant from a pulse conversion is fixed or controlled by use of optical switches which select or deselect a number of pulse converters used and/or the paths used in the pulse converters.

19. Apparatus as claimed in claim 15 in which any one or more of the pulse train width, pattern, and energy is varied to help to correct for non-linearities.

20. Apparatus as claimed in claim 15 in which any one or more of the returning Raman Stokes, Raman anti-Stokes and Rayleigh signals may be compared to correct for any non-linearity in the signals.

21. A method of sensing conditions at one or more sensing locations along a waveguide, comprising:
    generating two or more streams of pulses having spatially separate paths, the pulses of one of the streams having a suitable shape to cause a controlled conversion of the pulses to a different wavelength;
    combining the streams to form a combined stream;
    sending the combined stream along the waveguide;
    receiving signals returned from the one or more sensing locations, by detecting an up shifted component returned from one of the pulses at a first wavelength, and a down shifted component returned from one of the pulses transmitted at a higher wavelength, down shifted to the first wavelength;
    compensating for different losses along the waveguide at different wavelengths; and
    determining the conditions based on the received signals.

22. A method of sensing conditions at one or more sensing locations along a waveguide, comprising:
    transmitting pulses of suitable shape to cause a controlled conversion of the pulses to a different wavelength by a stimulated inelastic scattering process in the waveguide before reaching a first sensing location, the power of the pulses being such that the different wavelength undergoes one or more further conversions to further different wavelengths by a stimulated inelastic scattering process beyond the first sensing location such that different parts of the waveguide are illuminated by different wavelengths;
    receiving signals returned from the first sensing location;
    distinguishing the returning optical signals at each of the different wavelengths; and
    determining the conditions based on the received signals.

23. A method of sensing conditions at one or more sensing locations along a waveguide, comprising:
    generating a stream of pulses;
    splitting the pulses into two or more streams;
    converting the wavelength of one of the streams to a different wavelength, before sending the streams along the waveguide;
    receiving signals returned from the sensing location;
    compensating for different losses along the waveguide at different wavelengths by detecting an up shifted component returned from one of the pulses at a first of the wavelengths, and a down shifted component returned from one of the pulses transmitted at a higher of the wavelengths, down shifted to the first wavelength; and
    determining the conditions based on the detected components.

24. A method for generating and transmitting high energy optical pulses along a waveguide which provides a scattering medium comprising:
    generating high energy optical pulses;
    lengthening a duration of each pulse before each pulse enters the waveguide to reduce a peak power such that stimulated Raman light is suppressed in the waveguide while maintaining pulse energy for transmission along the waveguide; and
    measuring different components of backscattered light from the waveguide for remote sensing.

* * * * *